United States Patent
Ben Abdelaziz

(10) Patent No.: US 11,458,886 B2
(45) Date of Patent: Oct. 4, 2022

(54) SYSTEM AND METHOD FOR THE DETECTION OF A SECOND VEHICLE IN A DETECTION ZONE OF A FIRST VEHICLE

(71) Applicant: FAURECIA INTERIEUR INDUSTRIE, Nanterre (FR)

(72) Inventor: Omar Ben Abdelaziz, Tille (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 64 days.

(21) Appl. No.: 16/939,036

(22) Filed: Jul. 26, 2020

(65) Prior Publication Data
US 2021/0023983 A1  Jan. 28, 2021

(30) Foreign Application Priority Data

Jul. 26, 2019 (FR) ...................................... 19 08527

(51) Int. Cl.
  *B60Q 1/26* (2006.01)
  *B60R 1/00* (2022.01)
  *G08G 1/16* (2006.01)

(52) U.S. Cl.
  CPC ............ *B60Q 1/2665* (2013.01); *B60R 1/006* (2013.01); *G08G 1/16* (2013.01)

(58) Field of Classification Search
  CPC .......... G01G 1/16; G01G 1/166; G01G 1/167; G05D 1/02; G05D 1/021; G05D 1/0231; B60Q 1/16; B60Q 1/26; B60Q 1/2665; B60Q 9/00; B60Q 9/008; B60R 1/00; B60R 1/006; B60R 2300/802; B60R 2300/8026; G08G 1/16; G08G 1/166; G08G 1/167
  See application file for complete search history.

(56) References Cited

U.S. PATENT DOCUMENTS

| | | | | |
|---|---|---|---|---|
| 2004/0150514 A1* | 8/2004 | Newman | ................ | G08G 1/166 340/435 |
| 2007/0027583 A1* | 2/2007 | Tamir | ..................... | G08G 1/164 701/1 |
| 2013/0043990 A1* | 2/2013 | Al-Jafar | ................. | B60Q 9/008 340/439 |
| 2015/0025708 A1* | 1/2015 | Anderson | .......... | A61B 5/02055 701/2 |

FOREIGN PATENT DOCUMENTS

DE       112013005834 T5      8/2015

OTHER PUBLICATIONS

NPL_search (Nov. 22, 2021).*
French Search Report corresponding to French Application No. FR 1908527, dated May 5, 2020, 2 pages.

* cited by examiner

*Primary Examiner* — Van T Trieu
(74) *Attorney, Agent, or Firm* — Reising Ethington P.C.

(57) ABSTRACT

A detection system designed to be mounted in a first vehicle. The detection system has a detection device configured to detect the presence of a second vehicle in a detection zone of the first vehicle, an alert device configured to generate a first stimulus perceptible by the driver of the first vehicle if a second vehicle is present in the detection zone, and a monitoring device configured to detect a reaction by the driver of the first vehicle in response to the first stimulus. The alert device is configured to generate a second stimulus in case of reaction by the driver of the first vehicle in reaction to the first stimulus.

17 Claims, 5 Drawing Sheets

SYSTEM AND METHOD FOR THE DETECTION OF A SECOND VEHICLE IN A DETECTION ZONE OF A FIRST VEHICLE

TECHNICAL FIELD

The present invention relates to the field of assistance in driving a vehicle, and in particular the detection of the presence of another vehicle in a detection zone of the vehicle, for example a blind spot of the vehicle.

BACKGROUND

In a motor vehicle, there is, on each side of the vehicle, a blind spot located on the side of and behind the vehicle, in which it is difficult for the driver of the motor vehicle to determine whether another motor vehicle is present, despite the presence of the inside rearview mirror and the side view mirrors.

It is possible to equip the motor vehicle with a system for detecting the presence of another motor vehicle in a blind spot, also called "blind spot detection system".

Such a blind spot detection system comprises a detection device able to detect the presence of another vehicle in a blind spot, and an alert device capable of alerting the driver of the presence of another vehicle and said blind spot.

The detection device for example comprises a radar. The alert device for example comprises a light indicator arranged on the side view mirror located on the side of the associated blind spot.

Such a blind spot detection system increases safety, by making it possible to alert the driver of the vehicle that another vehicle is present in the blind spot, and that it would be dangerous to move his vehicle sideways on the side of the blind spot in question.

DE112013005834T5 discloses a blind spot detection system installed on a first vehicle, the blind spot detection system comprising a blind spot camera for detecting a second vehicle in a blind spot of the first vehicle, a warning device for emitting a light signal for indicating the presence of the second vehicle to the driver of the first vehicle, a face analysis camera for analyzing the face of the driver of the first vehicle for detecting a reaction of the driver of the first vehicle to the warning signal, and an entry unit such as a physical switch, a virtual button on a screen or a voice command, allowing the driver of the vehicle to indicate that he has taken into account the presence of another vehicle in the blind spot (c.f. [0047] to [0053] of DE112013005834T5).

In the blind spot detection system of DE112013005834T5, the face analysis camera and the entry unit are provided in combination to allow the driver of the first vehicle to positively indicate that he/she took into account the presence of the second vehicle.

SUMMARY

One of the aims of the invention is to improve the safety provided by a system for detecting the presence of another vehicle in a detection zone of a vehicle.

To that end, the invention proposes, in at least some embodiments, a detection system configured to be mounted in a first vehicle, the detection system comprising a detection device configured to detect the presence of a second vehicle in a detection zone of the first vehicle, an alert device configured to generate a first stimulus perceptible by the driver of the first vehicle if a second vehicle is present in the detection zone, a monitoring device configured to detect a reaction by the driver of the first vehicle in response to the first stimulus, the alert device being configured to generate a second stimulus in case of reaction by the driver of the first vehicle in reaction to the first stimulus.

Even if the detection system emits an alert indicating the presence of a second vehicle in a detection zone, it is possible for the driver of the first vehicle not to perceive this alert, for example because his attention is drawn by something else at the same time.

The monitoring device makes it possible to detect whether the driver of the first vehicle has in fact taken account of a presence alert of the second vehicle in the detection zone, and the alert device emitting a second stimulus perceptible by the driver of the second vehicle makes it possible to inform this driver that the alert has indeed been taken into account by the driver of the first vehicle or to alert the driver of the second vehicle that the alert has not been taken into account by the driver of the first vehicle.

Thus, the driver of the second vehicle knows whether he can continue his maneuver in complete safety or whether he must be vigilant and/or interrupt his maneuver leading him to occupy the detection zone of the first vehicle.

According to specific exemplary embodiments, the detection system comprises one or several of the following optional features, considered alone or according to all technically feasible combinations:
 the second stimulus is generated so as to be perceptible by the driver of the second vehicle;
 the first stimulus is a first light signal and/or the second stimulus is a second light signal;
 the first stimulus is a first light signal generated by a light indicator;
 the second stimulus is a second light signal generated by the light indicator or by an additional light indicator separate from the light indicator;
 the second light signal is emitted with a color different from that of the first light signal and/or with a blinking or steady display mode different from that of the first light signal;
 the light indicator is located on a rearview mirror of the first vehicle, in particular a side view mirror of the first vehicle associated with the detection zone; and
 it is configured to display the light indicator on a display screen configured to display images acquired by a rearview camera arranged to film the scene located behind the first vehicle;
 the alert device is configured to generate a third stimulus in the absence of reaction from the driver of the first vehicle to the first stimulus detected by the monitoring device;
 the alert device is configured in order, after a time delay after the detection of the presence of the second vehicle in the detection zone and/or after the emission of the first stimulus, to emit a fourth stimulus perceptible by the driver of the first vehicle and different from the first stimulus, to again signal the presence of the second vehicle in the detection zone of the first vehicle;
 the alert device is configured in order, after the emission of the fourth stimulus, to emit a fifth stimulus perceptible by the driver of the second vehicle and signaling the taking into account, by the driver of the first vehicle, of the presence of the second vehicle in the detection zone of the first vehicle.

The invention also relates to a detection method comprising detecting the presence of a second vehicle in a detection zone of a first vehicle using a detection device, generating a first stimulus perceptible by the driver of the first vehicle if a second vehicle is present in the detection zone, detecting a reaction by the driver of the first vehicle in response to the first stimulus using a monitoring device, and generating a second stimulus in case of reaction by the driver of the first vehicle in response to the first stimulus.

According to specific embodiments, the method comprises one or more of the following optional features, considered individually or according to any technically possible combination(s):
- the first stimulus is a first light signal generated using a light indicator;
- the second stimulus is a second light signal generated using the same light indicator as the first light signal, the first light signal and the second light signal being different;
- the first stimulus is a first light signal generated using a light indicator;
- the second stimulus is a second light signal generated using an additional light indicator separate from the light indicator;
- the second stimulus is generated so as to be perceptible by the driver of the second vehicle located in the detection zone of the first vehicle;
- it comprises generating a third stimulus if no reaction is detected from the driver of the first vehicle to the first stimulus;
- it comprises, after a time delay after the detection of the presence of the second vehicle in the detection zone and/or after the emission of the first stimulus, emitting a fourth stimulus perceptible by the driver of the first vehicle and different from the first stimulus, to again signal the presence of the second vehicle in the detection zone of the first vehicle;
- after the emission of the fourth stimulus, emitting a fifth stimulus perceptible by the driver of the second vehicle and signaling the taking into account, by the driver of the first vehicle, of the presence of the second vehicle in the detection zone of the first vehicle.

BRIEF DESCRIPTION OF THE DRAWINGS

The invention and its advantages will be better understood upon reading the following description, provided solely as a non-limiting example, and done in reference to the appended drawings, in which.

DETAILED DESCRIPTION

Figure 1:
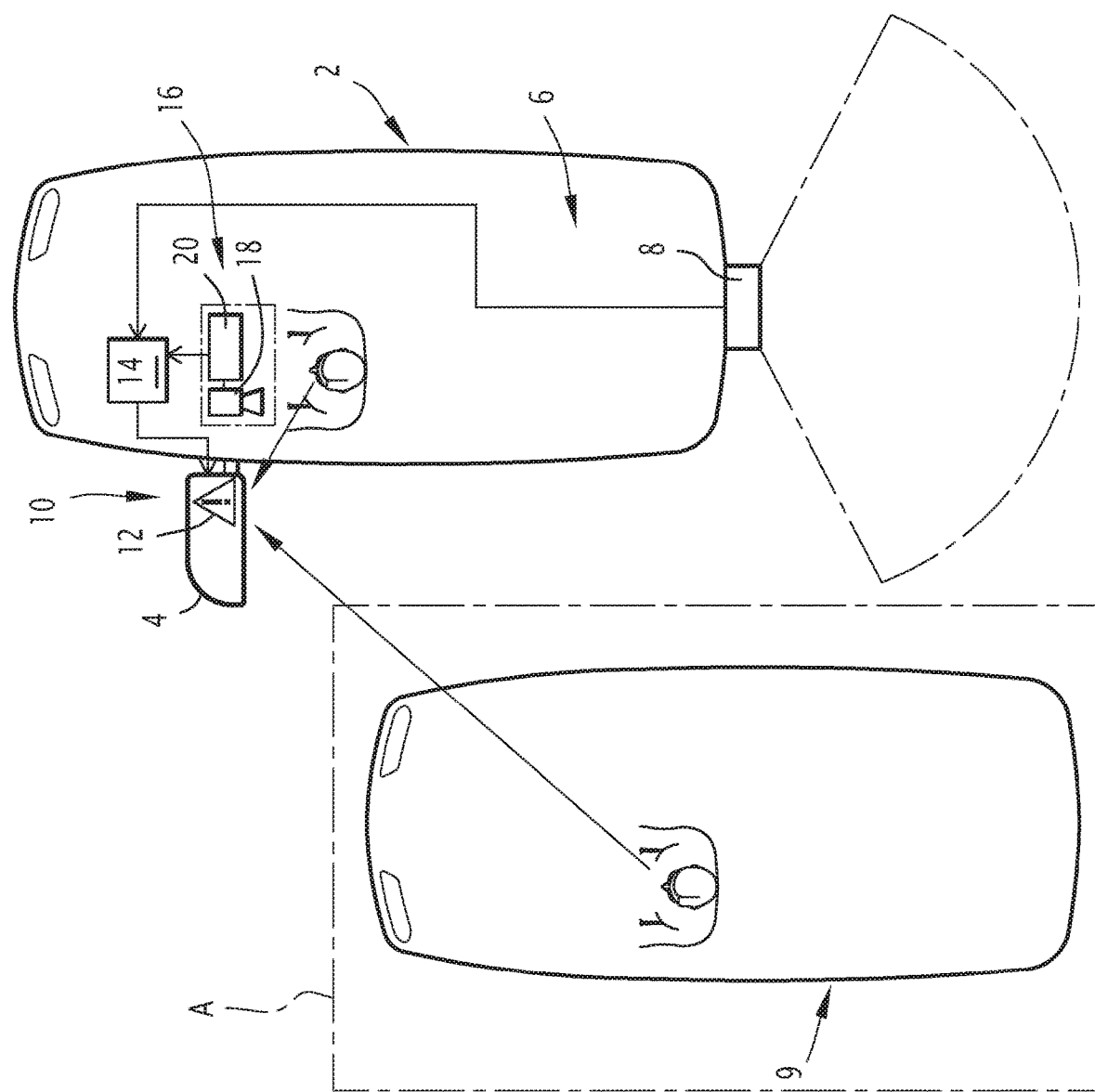
FIG. 1 is a schematic view of a first vehicle equipped with a detection system and of a second vehicle located in a detection zone.

The first vehicle 2 of FIG. 1 is provided with a side view mirror 4 arranged to allow the driver to look to the side of and behind the first vehicle 2, for example to detect the presence of a second vehicle 9.

The first vehicle 2 is equipped with a detection system 6 configured to alert the driver of the first vehicle 2 to the presence of a second vehicle 9 in a detection zone A.

The detection zone A is a zone located near the first vehicle 2 and in which the detection system 6 is provided to detect any presence of a second vehicle 9.

The detection zone A for example includes one or several blind spots of the first vehicle.

In the example illustrated in FIG. 1, the detection zone A is a blind spot located laterally on a first side of the vehicle 2 and toward the rear of the first vehicle 2, in which it may prove difficult for the driver to detect the presence of a second vehicle 9.

The detection system 6 comprises a detection device 8 configured to detect the presence of a second vehicle 9 in the detection zone A.

In a manner known in itself, the detection device 8 for example comprises a radar system.

The detection system 6 comprises an alert device 10 configured to emit a first stimulus perceptible by the driver of the first vehicle 2 if a second vehicle is present in the detection zone A.

The alert device 10 comprises a stimulus generator to generate the first stimulus.

In one exemplary embodiment, the alert device 10 comprises a light indicator 12 associated with the detection zone A. The first stimulus is therefore a light signal generated by the light indicator 12.

The alert device 10 is configured to control the illumination of the light indicator 12 in case of detection, by the detection device 8, of the presence of a second vehicle 9 in the detection zone A associated with the light indicator 12.

The alert device 10 for example comprises a control unit 14 connected to the detection device 8 and to the light indicator 12 to control the illumination of the light indicator 12 in case of detection, by the detection device 8, of the presence of a second vehicle 9 in the detection zone A associated with the light indicator 12.

In one exemplary embodiment, the light indicator 12 is arranged on the side view mirror 4 associated with the detection zone A.

Thus, the driver of the first vehicle 2 can see the light signal emitted by the light indicator 12 when he looks at the side view mirror 4, for example to verify the absence of another vehicle when he intends to move the first vehicle 2 sideways on the side of the detection zone A.

The detection system 6 comprises a monitoring device 16 configured to detect a reaction by the driver of the first vehicle 2 in response to the first stimulus.

The monitoring device 16 makes it possible to determine whether the driver of the first vehicle 2 has perceived the stimulus. It is for example configured to determine whether the driver reacts to the first stimulus.

If the driver reacts to the first stimulus, it is considered that he has perceived the first stimulus, and if the driver does not react to the first stimulus, it is considered that he has not perceived the first stimulus.

More specifically, if the monitoring device 16 detects a reaction of the driver of the first vehicle 2 to the first stimulus, the monitoring device 16 considers that the driver of the first vehicle has perceived the first stimulus, and if the monitoring device 16 does not detect a reaction of the driver of the first vehicle 2 to the first stimulus, the driver does not react to the first stimulus, the monitoring device 16 considers that he has not perceived the first stimulus.

The monitoring device 16 is configured for automatically detecting a reaction of the driver of the first vehicle 2 to the emission of the first stimulus.

The monitoring device 16 is configured for detecting a reaction of the driver of the first vehicle 2 without positive action of the driver for indicating that he/she has perceived the first stimulus.

The monitoring device 16 is for example configured to detect the movements of the eyes of the driver of the first vehicle 2, so as to detect whether the driver has perceived the first visual stimulus. Such a monitoring device 16 is also referred to using the expression "oculometry device."

The monitoring device 16 is configured to detect the movements of the eyes of the driver of the first vehicle 2, so as to detect whether the driver of the vehicle 2 has looked at the light indicator 12 emitting the first stimulus.

The monitoring device 16 for example comprises a camera 18 arranged to capture images of the eyes of the driver of the first vehicle 2, and a processing unit 20 configured to analyze the images captured by the camera 18 to detect the movements of the eyes of the driver of the first vehicle 2.

The processing unit 20 is more specifically configured to detect whether the driver is looking at the light indicator 12 when the latter is activated due to the detection of the presence of the second vehicle 9 in the detection zone A.

The processing unit 20 for example comprises a memory, a processor and a software application for image analysis stored in the memory and executable by the processor. In a variant, the processing unit 20 is a programmable logic circuit or an application-specific integrated circuit (ASIC).

The alert device 10 is configured to generate a second stimulus if a reaction is detected from the driver of the first vehicle 2 in response to the first stimulus.

The alert device 10 is for example configured to generate the second stimulus once the monitoring device 16 detects that the driver of the first vehicle 2 has perceived the first stimulus, in particular that the driver of the first vehicle has looked at the light indicator 12 emitting the first stimulus.

The detection, by the monitoring device 16, of the perception of the first stimulus by the driver of the first vehicle, triggers the generation, by the alert device 10, of the second stimulus.

More specifically, the detection, by the monitoring device 16, of the perception of the first stimulus by the driver of the first vehicle 2, systematically triggers the generation, by the alert device 10, of the second stimulus, in particular without any additional condition and/or without further action of the driver of the first vehicle 2 being necessary for the emission of the second stimulus.

In particular, the second stimulus is emitted without requiring a positive action of the driver of the first vehicle 2, such as actuating a control such as a control switch, a control lever, a control knob or a control button.

The detection system 6 relies solely on the detection of a reaction of the driver of the first vehicle 2 performed automatically by the monitoring device 16 for triggering the emission of the second stimulus.

The second stimulus is generated so as to be perceptible by the driver of the second vehicle located in the detection zone of the first vehicle 9 located in the detection zone A.

Thus, the driver of the second vehicle 9 can know that the driver of the first vehicle 2 is indeed aware of the presence of the second vehicle 9 in the detection zone A, and can continue his maneuver in complete safety, or know that the driver has not reacted to the first stimulus and interrupt his maneuver.

The alert device 10 comprises a stimulus generator to generate the second stimulus.

The second stimulus is for example a visual stimulus, in particular a light signal.

The alert device 10 for example comprises a light indicator for generating the second stimulus in the form of a light signal.

A light indicator for generating the second stimulus in the form of a light signal is for example arranged on the side view mirror 4 associated with the detection zone A.

Such a light indicator is in fact generally perceptible by the driver of the second vehicle 9 located in the detection zone A corresponding to a blind spot of the vehicle.

In the exemplary embodiment of FIG. 1, the alert device 10 is configured to emit the second stimulus in the form of a light signal emitted using the light indicator 12 used to signal the presence of a second vehicle 9 in the detection zone A to the driver.

Thus, the alert device 10 is configured to emit the first stimulus and the second stimulus using the same stimulus generator.

The light indicator 12 is arranged on the first vehicle 2 such that the light signal emitted by this light indicator 12 is perceptible by the driver of the other vehicle located in the detection zone A.

In one exemplary embodiment, the light indicator 12 is arranged on the side view mirror 4 associated with the detection zone A, which is generally visible by the driver of a vehicle located in the detection zone A.

The alert device 10 is for example configured to emit the first stimulus with a second color different from the first color. The light indicator 12 is in this case suitable for generating light signals in different colors.

Optionally or in a variant, the first light signal and the second light signal generated by the same light indicator 12 differ by the blinking or steady display mode.

For example, one among the first light signal and the second light signal is blinking, the other being steady. In a variant, the first light signal and the second light signal are both blinking, but with different blinking frequencies.

It is possible to combine the variations, for example such that the first light signal and the second light signal differ by the color and the blinking or steady display mode.

Figure 2:
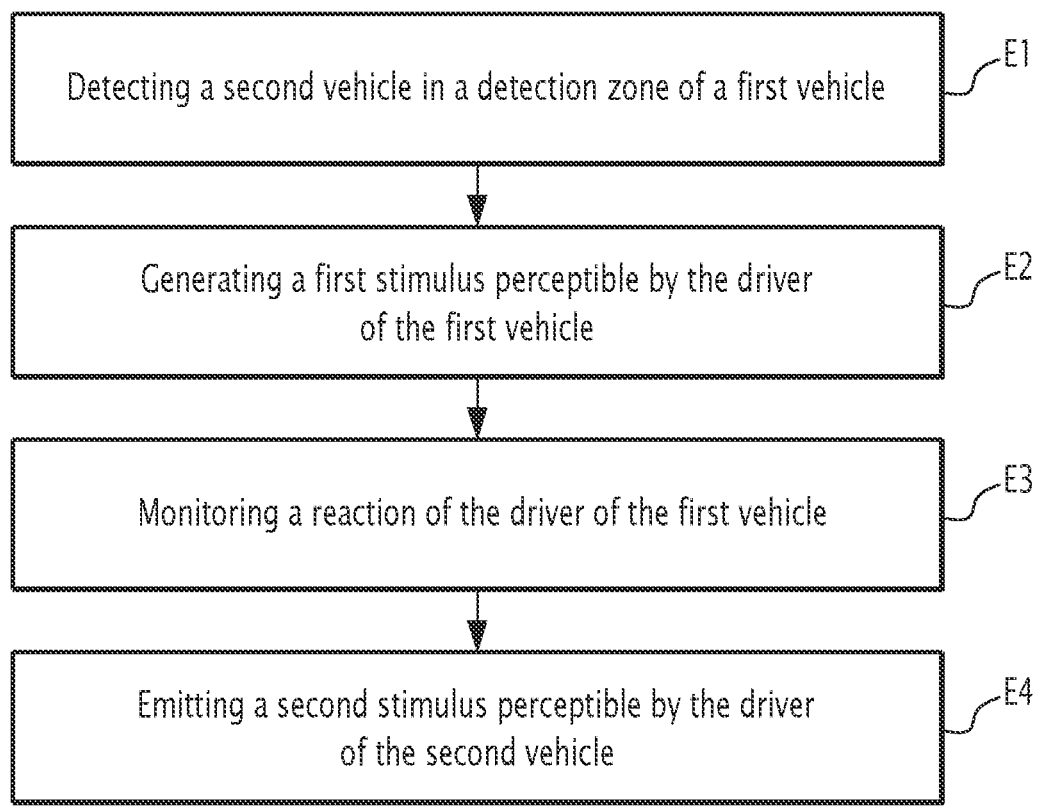
FIG. 2 is a diagram illustrating a method implemented by the detection system.

FIG. 2 illustrates steps of a detection method that can be carried out by the detection system 6.

In a detection step E1 carried out by the detection device 8, the detection method comprises detecting any vehicle that may be located in the detection zone A.

In a first alert step E2, if the presence of a second vehicle 9 is detected in the detection zone A, the detection method comprises generating the first stimulus perceptible by the driver of the first vehicle 2.

In the detection system 6 of FIGS. 1 and 2, the detection of a second vehicle 9 in the detection zone A, the detection device 8 sends a message from the alert device 10 that generates the first stimulus, here by illuminating the light indicator 12 so as to generate the first light signal.

In a monitoring step E3 following the alert step E2, the detection method comprises monitoring the reaction of the driver of the first vehicle 2 in order to determine whether the latter has perceived the first stimulus, that is to say, whether he has seen the first light signal.

The monitoring step E3 for example comprises detecting movements by the eyes of the driver of the first vehicle 2.

The monitoring step here is carried out by the monitoring device 16, which detects the movements of the eyes of the driver of the first vehicle 2 in order to see whether he has perceived the first stimulus generated in the form of a light signal.

In a second alert step E4, if the monitoring step has made it possible to determine that the driver of the first vehicle 2 has perceived the first stimulus, the detection method comprises emitting a second stimulus perceptible by the driver of the second vehicle 9, to inform him that the driver of the first vehicle 2 has indeed perceived the first stimulus.

The second stimulus is for example generated once the monitoring device 16 detects that the driver of the first vehicle 2 has perceived the first stimulus, in particular once the driver of the first vehicle has looked at the light indicator 12 emitting the first stimulus.

The detection, by the monitoring device 16, of the perception of the first stimulus by the driver of the first vehicle, triggers the generation of the second stimulus.

This second alert step E4 here is carried out by the monitoring device 16, which sends the alert device 10 a message indicating that the driver of the first vehicle 2 has perceived the first stimulus, in response to which the alert device 10 emits the second stimulus, for example by emitting a second light signal different from the first light signal using the same light indicator 12.

The driver of the second vehicle 9 is informed by the detection system 6 of the first vehicle 2 whether the driver of the first vehicle 2 has indeed perceived the first stimulus indicating the presence of the second vehicle 9 and the detection zone A of the first vehicle 2, and can therefore continue his maneuver safely, or to pay attention before finalizing his maneuver.

In addition, the reaction of the driver of the first vehicle 2 is detected automatically by the monitoring device 16 and the emission of the second stimulus is triggered automatically without any positive intervention of the driver of the first vehicle 2. The operation of the detection system 6 is thus much more fluid and simple for the driver of the first vehicle 2. The user experience is improved while ensuring safety.

The invention is not limited to the exemplary embodiments and the variants described hereinabove. Other exemplary embodiments and other variants are conceivable.

For example, in the detection system 6 of FIGS. 1 and 2, the alert device 10 is configured to generate the first stimulus and the second stimulus in the form of two separate light signals, using a same light indicator 12.

In another exemplary embodiment, the alert device 10 comprises two separate stimulus generators provided to generate respectively the first stimulus and the second stimulus.

Figure 3:
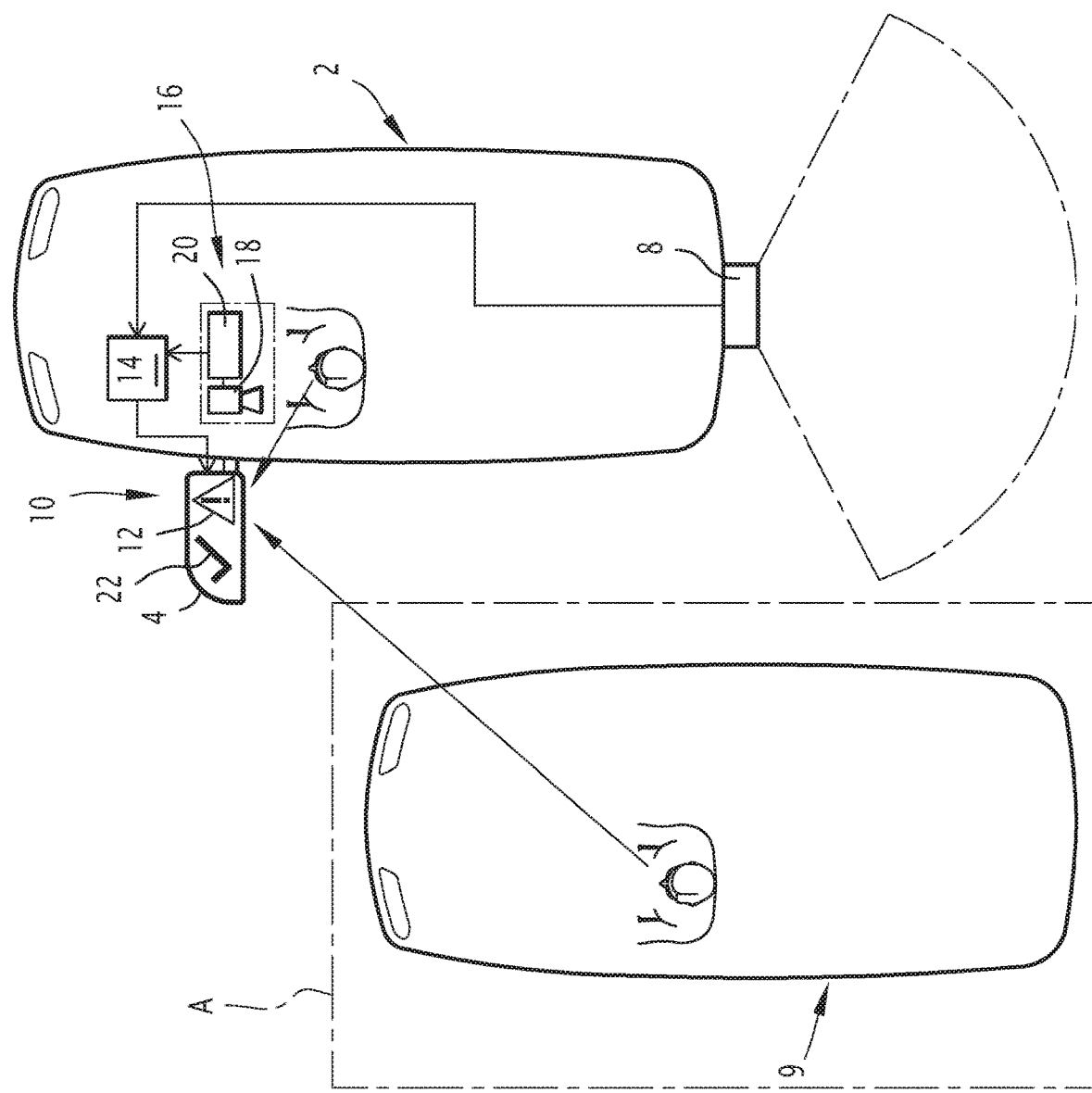
FIG. 3 is a schematic view of the detection system according to another exemplary embodiment.

In the exemplary embodiment illustrated in FIG. 3, the alert device 10 comprises an additional light indicator 22 in order to generate the second light signal.

The additional light indicator 22 is for example arranged on the side view mirror 4 associated with the detection zone A.

Thus, in one exemplary embodiment, the side view mirror 4 associated with the detection zone A simultaneously bears the light indicator 12 for generating the first stimulus and the additional light indicator 22 for generating the second stimulus.

In other exemplary embodiments, the additional light indicator 22 is offset relative to the side view mirror 4.

It is for example arranged on a support of the side view mirror 4, in particular on a mirror shell of the side view mirror 4.

In one specific exemplary embodiment, the light indicator 12 is borne by the side view mirror 4 and the additional light indicator 22 is offset relative to the side view mirror 4.

Figure 4:
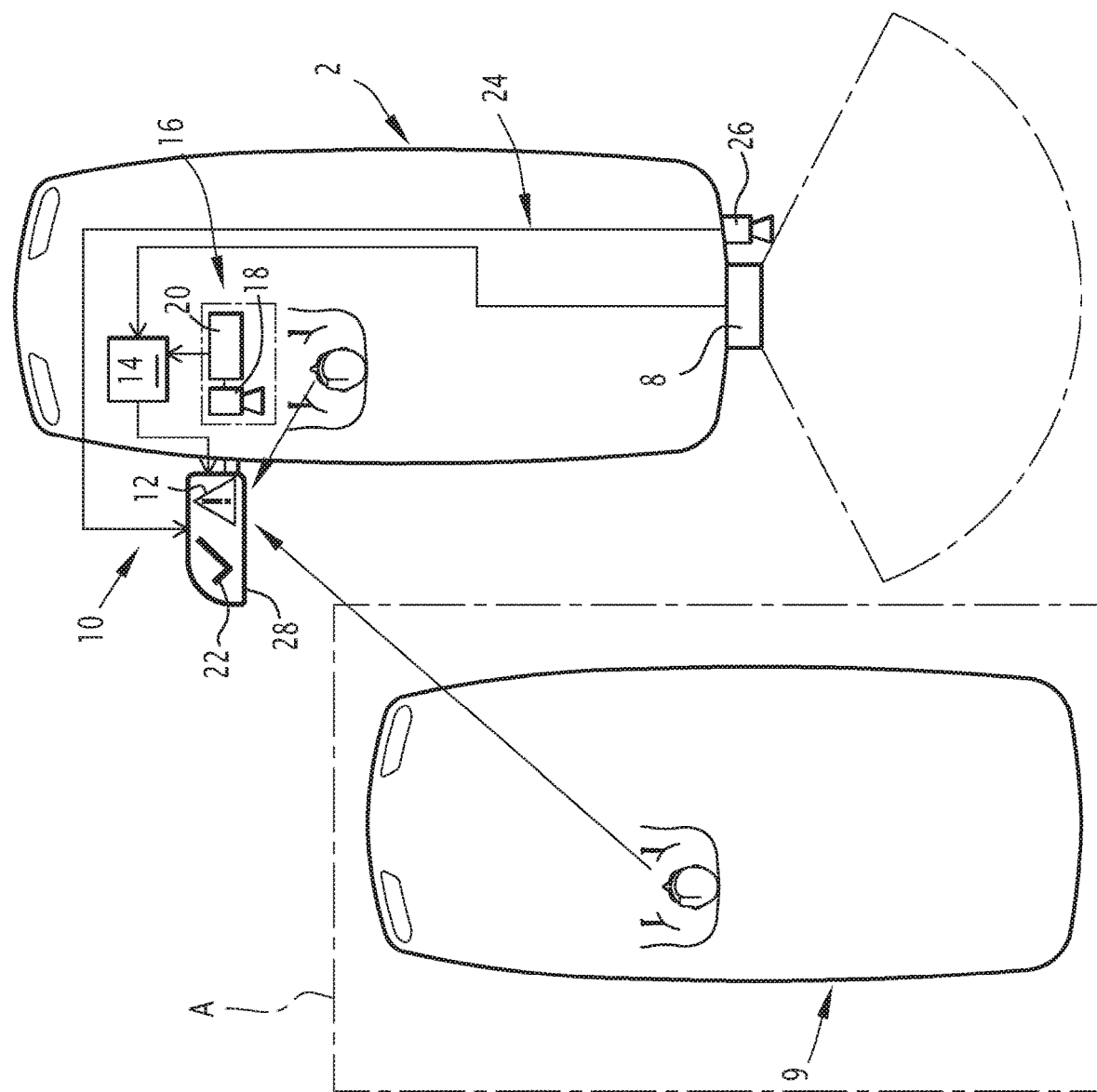
FIG. 4 is a schematic view of the detection system according to another exemplary embodiment.

In one exemplary embodiment illustrated in FIG. 4, the side view mirror 4 is replaced by an electronic rearview system 24 comprising a rearview camera 26 arranged on the first vehicle 2 so as to capture images of the scene located behind the first vehicle 2, and a display screen 28 for displaying the images captured by the rearview camera 26 such that the driver of the first vehicle 2 can see these images.

The camera 26 is for example a camera of the CMOS ("Complementary Metal Oxide Semiconductor") or CCD (Charges Coupled Device") type.

The display screen 28 has a pixel matrix making it possible to display a digital image stored in the form of a digital file.

The display screen 28 is for example a liquid crystal display (LCD) screen, a light-emitting diode (LED) screen or an organic light-emitting diode (OLED) screen.

The first stimulus is for example displayed on the display screen 28 in the form of a light indicator.

The second stimulus is for example displayed on the display screen 28, in the form of the same light indicator as the first stimulus, that is to say, having the same shape and located in the same location on the display screen 26, but generating a different light signal, for example modifying the color and/or a blinking or steady display mode.

In a variant, the second stimulus is displayed on the display screen 28 in the form of an additional light indicator 22, with a different shape and/or located in another location on the display screen 28.

When the second stimulus is generated by a light indicator located on the display screen 28, the display screen 28 is located outside the passenger compartment of the vehicle or inside the passenger compartment of the vehicle, in a zone visible by the driver of another vehicle located in the detection zone A.

The display screen 28 is for example arranged in place of a side view mirror, outside the passenger compartment of the first vehicle.2 In a variant, the display screen 28 is arranged inside the passenger compartment of the first vehicle 2, for example on a side door or on the dashboard of the first vehicle 2.

In another exemplary embodiment, the second stimulus is displayed by an additional light indicator that is offset relative to the display screen 26. The offset additional light indicator is located inside the passenger compartment of the vehicle or outside the passenger compartment of the vehicle, for example on the side of the vehicle, preferably on the side of the detection zone A.

The stimuli in the form of light signals are perceptible quickly and irrespective of the sound environment.

This being the case, in other exemplary embodiments, the first stimulus could be a sound stimulus and/or the second stimulus could be a sound stimulus.

Furthermore, the invention has been described by illustrating a detection zone A that corresponds to a blind spot of the first vehicle.

It is possible for the detection zone to be another zone of the first vehicle, for example a rear zone of the vehicle. Furthermore, it is possible to provide several detection zones.

In one exemplary embodiment, the detection system is configured to detect the presence of a second vehicle in several detection zones, with generation of a first stimulus for each detection zone, and for the generation of a second stimulus for each detection zone as a function of the reaction of the driver of the vehicle in response to the first stimulus emitted for each detection zone.

Figure 5:
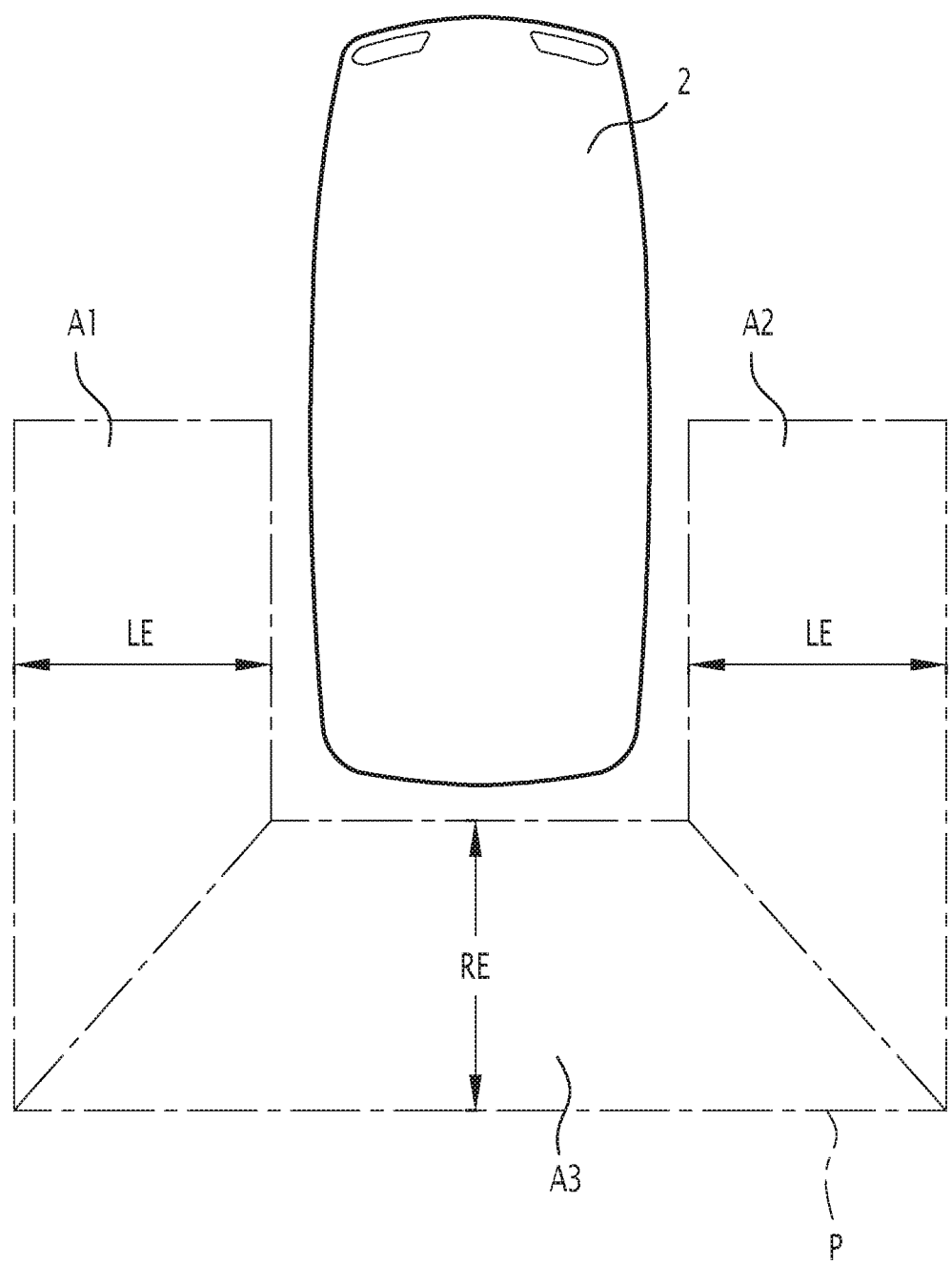
FIG. 5 is a schematic view of the detection system according to still another exemplary embodiment.

As illustrated in FIG. 5, the detection zones for example include two lateral detection zones A1, A2, each located on a respective side of the first vehicle and toward the rear of the first vehicle, and/or a rear detection zone A3 located behind the first vehicle. For example, each lateral detection zone A1, A2 is a blind spot zone of the first vehicle 2.

Each detection zone A1, A2, A3 is for example associated with a stimulus generator, for example a light indicator, in order to generate the first stimulus indicating the presence of a second vehicle in the detection zone A1, A2, A3 and with a stimulus generator, for example the same light indicator or another light indicator, in order to generate the second stimulus visible by the driver of the second vehicle and indicating that the first stimulus has been taken into account by the driver of the first vehicle.

For example, the stimulus generator(s) associated with each lateral detection zone A1, A2 is (are) located on the corresponding side view mirror or on the corresponding display screen of an electronic rear view system, and the stimulus generator(s) associated with the rear detection zone is (are) located on the central rearview mirror or a corresponding display screen of an electronic rear view system.

Preferably, the detection zones A1, A2, A3 together define a monitoring perimeter extending laterally to the left and right of the vehicle over a lateral extension LE of about 3 meters, which substantially corresponds to the width of a traffic lane, and extending behind the vehicle over a rear extension RE of several meters, for example a rear extension RE of between 3 and 20 meters, for example between 3 and 15 meters.

In one exemplary embodiment, the rear extension RE varies as a function of the movement speed of the first vehicle, and preferably increases with the movement speed of the first vehicle.

The rear extension RE for example has a first value when the speed of the vehicle is below a threshold speed, and a second value strictly greater than the first value when the speed of the vehicle is above the threshold speed.

According to one specific embodiment, the rear extension RE is 3 meters when the speed of the vehicle is less than 50 km/h, and 5 meters when the speed of the vehicle is greater than 50 km/h.

This avoids false alerts at low speed and takes account of the higher speed of the other vehicles at high speed.

Furthermore, the invention has been illustrated in FIGS. 1 to 5 with a first vehicle and a second vehicle in the form of light motor vehicles.

Of course, the invention applies to all types of vehicles, whether it is the first vehicle equipped with the detection system or the second vehicle whose presence is detected.

The first vehicle and the second vehicle can each be a vehicle with at least four wheels (a car, truck, bus, etc.), a vehicle with three wheels (three-wheeled car, motorcycle or scooter with three wheels) or a vehicle with two wheels (motorcycle, scooter, bicycle), motorized or non-motorized.

Furthermore, in the exemplary embodiments previously described, the second stimulus indicates that the driver of the first vehicle 2 has reacted to the first stimulus, and therefore that he has taken account of this first stimulus indicating the presence of the second vehicle 9 in the detection zone of the first vehicle 2.

Of course, the absence of second stimulus indicates that the driver of the first vehicle 2 has not taken the first stimulus into account indicating the presence of the second vehicle 9 in the detection zone of the first vehicle 2.

In a variant or optionally, it is possible to provide that the detection system 6 generates a third stimulus, perceptible by the driver of the second vehicle 9 present in the detection zone, and indicating that the driver of the first vehicle 2 has not (yet) reacted to the first stimulus, and therefore that he has not (yet) taken this first stimulus into account indicating the presence of the second vehicle 9 in the detection zone of the first vehicle 2.

Thus, the driver of the second vehicle 9 can determine, owing to the third stimulus, that he must be cautious because the driver of the first vehicle 2 has not taken account of the alert represented by the first stimulus.

The second stimulus is a "positive stimulus," that is to say, indicating that the first stimulus has been taken into account, while the third stimulus is a "negative stimulus," that is to say, indicating that the first stimulus has not been taken into account.

In one exemplary embodiment, the third stimulus is generated as long as the second vehicle 9 is present in the detection zone of the first vehicle 2 and the driver of the first vehicle 2 has not reacted to the first stimulus, and the third stimulus ceases to be generated once the second vehicle 9 is no longer present in the detection zone of the first vehicle 2 and/or the monitoring device 16 has determined that the driver of the first vehicle has reacted to the first stimulus.

This exemplary embodiment can be implemented without generating a second stimulus, since the driver of the second vehicle 9 present in the detection zone knows that the driver of the first vehicle 2 has taken the first stimulus into account once the third stimulus is no longer generated.

It can also be combined with the generation of the second stimulus. In this case, the third stimulus is for example emitted until the monitoring device 16 determines that the driver of the first vehicle 2 has reacted to the first stimulus, and then the second stimulus is emitted.

This makes it possible to inform the driver of the second vehicle 9 that the first stimulus has not yet been taken into account by the driver of the first vehicle 2 by the emission of the third stimulus, then to inform the driver of the second vehicle 9 that the first stimulus has been taken into account by the driver of the first vehicle 2 by ceasing the emission of the third stimulus and beginning the emission of the second stimulus.

In one exemplary embodiment, the detection system 6 generates the third stimulus after a time delay, for example of several seconds, typically 1 to 3 seconds, after the beginning of the emission of the first stimulus.

This exemplary embodiment makes it possible to indicate to the driver of the second vehicle 9, through the third stimulus, that the driver of the first vehicle 2 has not yet taken the first stimulus into account several seconds after the beginning of the emission of the first stimulus.

The emission of the third stimulus after a time delay makes it possible to leave the driver of the first vehicle time to react to the first stimulus without immediately emitting the third stimulus to avoid asking too much from the drivers.

When the detection system 6 is configured to emit the second stimulus and the third stimulus, the first stimulus, the second stimulus and the third stimulus are different.

They may be generated by a same stimulus generator or by at least two separate stimulus generators, and in particular by separate respective stimulus generators.

In one embodiment in which the first stimulus, the second stimulus and the third stimulus are different light signals, the first stimulus, the second stimulus and the third stimulus are generated by a same light indicator or by at least two different light indicators, and in particular by different respective light indicators.

Thus, in one exemplary embodiment, the first stimulus is a first light signal generated by a light indicator 12, the second stimulus is a second light signal generated by an additional light indicator 22 separate from the light indicator 12, and the third stimulus is a third signal generated by an additional light indicator separate from the light indicator 12.

Furthermore, in one exemplary embodiment, the second stimulus and the third stimulus are light signals generated by a same light indicator (for example, the additional light indicator 22) or by separate light indicators.

Optionally, the detection system is configured to generate, after a time delay after detecting the presence of the second vehicle 9 in a detection zone of the first vehicle 2 and/or after the beginning of the emission of the first stimulus indicating this presence, a fourth stimulus perceptible by the driver of the first vehicle 2, the fourth stimulus being different from the first stimulus.

This fourth stimulus is different from the first stimulus and is intended to cause the driver of the first vehicle 9 to react, for [example] if his attention is not strong enough or if his attention is already monopolized by something else.

The fourth stimulus is for example a visual, audio and/or haptic stimulus.

A haptic stimulus perceptible by the driver of the first vehicle 2 is for example generated using a vibration generator housed in the seat of this driver or in a steering wheel of the first vehicle 2.

The fourth stimulus is preferably more intrusive for the driver of the first vehicle 2 than the first stimulus. For example, the driver of the first vehicle 2 may find it difficult to ignore a vibrating fourth stimulus whereas he may not react to a first visual stimulus located on the periphery of his field of view, for example in the form of a light signal generated by a light indicator 12 on a side view mirror 4 of the first vehicle 2.

In one exemplary embodiment, the detection system 6 is configured in order, after having generated the fourth stimulus, to generate a fifth stimulus perceptible by the driver of the second vehicle 9 and indicating to him that the presence of the second vehicle in the detection zone of the first vehicle 2 has indeed been taken into account by the driver of the first vehicle 2.

The fifth stimulus is for example similar or identical to the second stimulus.

In one embodiment, it is generated by the same stimulus generator as the second stimulus, for example by the same light indicator, whether it involves the light indicator 12 already used for the first stimulus or an additional light indicator 22.

The invention claimed is:

1. A detection system designed to be mounted in a first vehicle, the detection system comprising a detection device configured to detect the presence of a second vehicle in a detection zone of the first vehicle, an alert device configured to generate a first stimulus perceptible by the driver of the first vehicle if a second vehicle is present in the detection zone, a monitoring device configured to detect a reaction by the driver of the first vehicle in response to the first stimulus, the alert device being configured to generate a second stimulus in case of reaction by the driver of the first vehicle in reaction to the first stimulus.

2. The detection system according to claim 1, wherein the second stimulus is generated so as to be perceptible by the driver of the second vehicle.

3. The detection system according to claim 1, wherein the first stimulus is a first light signal and/or wherein the second stimulus is a second light signal.

4. The detection system according to claim 1, wherein the first stimulus is a first light signal generated by a light indicator.

5. The detection system according to claim 4, wherein the second stimulus is a second light signal generated by the light indicator or by an additional light indicator separate from the light indicator.

6. The detection system according to claim 5, wherein the second light signal is emitted with a color different from that of the first light signal and/or with a blinking or steady display mode different from that of the first light signal.

7. The detection system according to claim 4, wherein the light indicator is located on a rearview mirror of the first vehicle, in particular a side view mirror of the first vehicle associated with the detection zone.

8. The detection system according to claim 4, configured to display the light indicator on a display screen configured to display images acquired by a rearview camera arranged to film the scene located behind the first vehicle.

9. The detection system according to claim 1, wherein the alert device is configured to generate a third stimulus in the absence of reaction from the driver of the first vehicle to the first stimulus detected by the monitoring device.

10. The detection system according to claim 1, configured such that the detection of the perception of the first stimulus by the driver of the first vehicle by the monitoring device triggers the generation of the second stimulus by the alert device.

11. The detection system according to claim 1, wherein said detection system is devoid of any entry unit such as a physical switch, a virtual button on a screen or a voice command, wherein said detection system is configured to allow the driver of the first vehicle to indicate that he has taken into account the presence of said second vehicle without using said entry unit.

12. A detection method comprising detecting the presence of a second vehicle in a detection zone of a first vehicle using a detection device, generating a first stimulus perceptible by the driver of the first vehicle if a second vehicle is present in the detection zone, detecting a reaction by the driver of the first vehicle in response to the first stimulus using a monitoring device, and generating a second stimulus in case of reaction by the driver of the first vehicle in response to the first stimulus.

13. The detection method according to claim 12, wherein the first stimulus is a first light signal generated using a light indicator, and the second stimulus is a second light signal generated using the same light indicator as the first stimulus, the first light signal and the second light signal being different.

14. The detection method according to claim 12, wherein the first stimulus is a first light signal generated using a light indicator and the second stimulus is a second light signal generated using an additional light indicator separate from the light indicator.

15. The detection method according to claim 12, wherein the second stimulus is generated so as to be perceptible by the driver of the second vehicle located in the detection zone of the first vehicle.

16. The detection method according to claim 12, comprising generating a third stimulus if no reaction is detected from the driver of the first vehicle to the first stimulus.

17. A detection system designed to be mounted in a first vehicle, the detection system comprising a detection device configured to detect the presence of a second vehicle in a detection zone of the first vehicle, an alert device configured to generate a first stimulus that is a light signal perceptible by the driver of the first vehicle if a second vehicle is present in the detection zone, a monitoring device configured to detect whether the driver of the first vehicle has looked at the light signal, the alert device being configured to generate a second stimulus in case the driver of the first vehicle has looked at the light signal.

\* \* \* \* \*